United States Patent
Belluomini et al.

(10) Patent No.: US 7,284,029 B2
(45) Date of Patent: Oct. 16, 2007

(54) 4-TO-2 CARRY SAVE ADDER USING LIMITED SWITCHING DYNAMIC LOGIC

(75) Inventors: Wendy A. Belluomini, Austin, TX (US); Ramyanshu Datta, Austin, TX (US); Chandler T. McDowell, Austin, TX (US); Robert K. Montoye, Austin, TX (US); Hung C. Ngo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 10/702,989

(22) Filed: Nov. 6, 2003

(65) Prior Publication Data

US 2005/0102345 A1    May 12, 2005

(51) Int. Cl.
*G06F 7/50* (2006.01)
(52) U.S. Cl. ...................................... 708/708
(58) Field of Classification Search ............... 708/708, 708/629, 630, 709
See application file for complete search history.

(56) References Cited

U.S. PATENT DOCUMENTS

| | | | |
|---|---|---|---|
| 3,340,388 A * | 9/1967 | Earle | 708/700 |
| 4,556,948 A * | 12/1985 | Mercy | 708/625 |
| 5,303,176 A * | 4/1994 | Hrusecky et al. | 708/627 |
| 5,805,491 A | 9/1998 | Bechade | |
| 5,818,747 A | 10/1998 | Wong | |
| 6,415,311 B1 | 7/2002 | Purcell et al. | |
| 6,466,960 B1 | 10/2002 | Winters | |
| 6,567,835 B1 | 5/2003 | Blomgren et al. | |
| 2003/0014459 A1* | 1/2003 | Fletcher | 708/708 |

* cited by examiner

*Primary Examiner*—Chuong D Ngo
(74) *Attorney, Agent, or Firm*—Robert A. Voigt, Jr.; Winstead PC (57) ABSTRACT

A 4-to-2 carry save adder using limited switching dynamic logic (LSDL) to reduce power consumption while reducing the delay of outputting the sum and carry bits. The 4-to-2 carry save adder may include a first LSDL circuit configured to output a sum bit. The carry save adder may further include a second LSDL circuit configured to output a carry bit. Both the first and second LSDL circuits use a carry generated in the current stage that was previously generated in the previous stage (next lower order bit position). Since the carry is generated in the current stage and not in the previous stage, the delay in outputting the sum and carry bits is reduced and hence the performance of carry save adders is improved. Further, since LSDL circuits were used in the carry save adder, power consumption was reduced while using a small amount of area.

18 Claims, 8 Drawing Sheets

4-TO-2 CARRY SAVE ADDER USING LIMITED SWITCHING DYNAMIC LOGIC

CROSS REFERENCE TO RELATED APPLICATIONS

The present invention is related to the following U.S. patent application which is incorporated herein by reference:

Ser. No. 10/702,992 entitled "Computing Carry-In Bit To Most Significant Bit Carry Save Adder In Current Stage" filed Nov. 6, 2003, now U.S. Pat. No. 7,216,141.

TECHNICAL FIELD

The present invention relates to the field of carry save adders, and more particularly to a 4-to-2 carry save adder with reduced power and faster performance.

BACKGROUND INFORMATION

Carry save adders are often employed in high-speed multipliers, where they generally are able to function more rapidly than "carry propagate" or "ripple carry" adders. A carry save adder is distinguished from other types of adders by the fact that the "carry bits" and half-sum bits (hereinafter referred to simply as "sum bits" for convenience), which result from each addition, are not immediately combined or consolidated but instead are saved separately from each other for subsequent use in the next addition to be performed by the next cascaded carry save adder.

Because a carry save adder does not completely perform the relatively time-consuming process of combining carries with sum bits between successive additions in the multiplication process but instead defers this task until the final cycle of the multiplying operation, they are faster than ripple carry adders.

Figure 1:
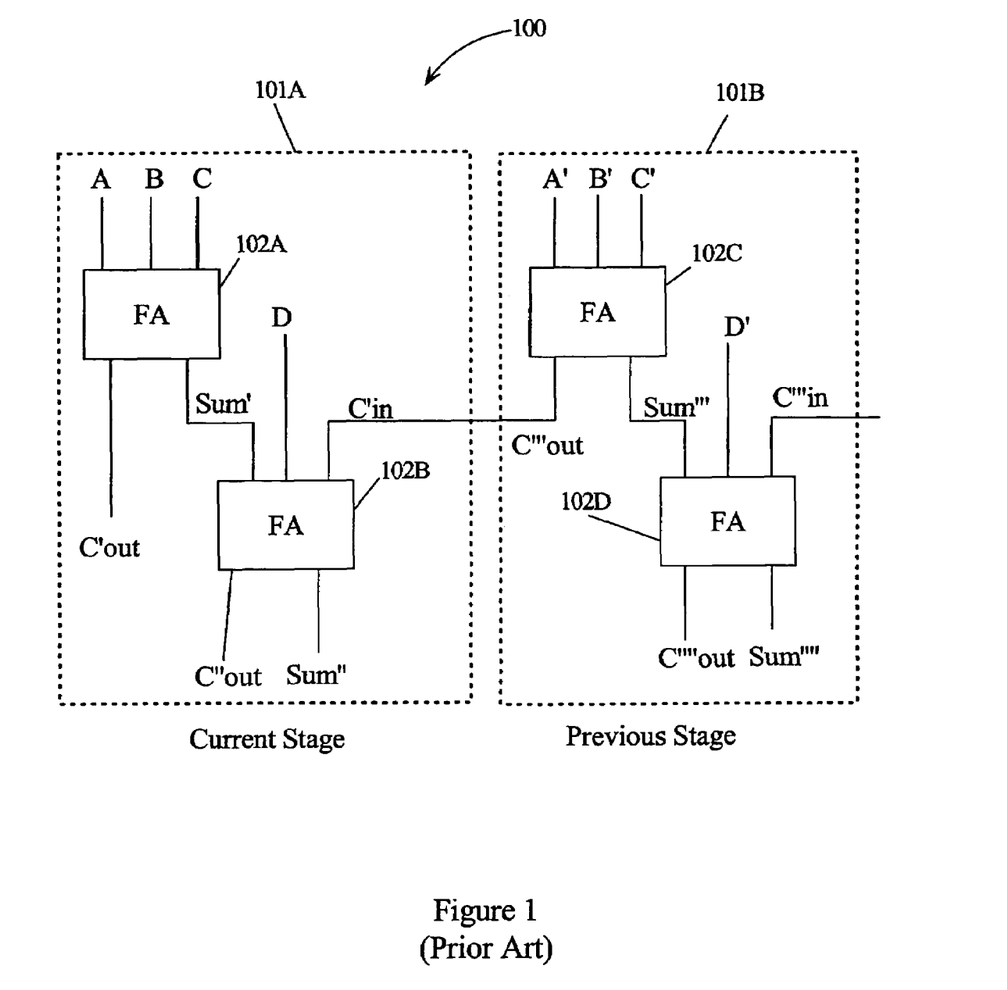
FIG. 1 illustrates a multiple stage 4-to-2 carry save adder.

Typically, carry save adders have multiple inputs, e.g., three inputs, designed to receive multiple numbers, e.g., three numbers, to be added and have two outputs, designated as "sum" and "carry." An example of such a carry save adder is illustrated in FIG. 1. FIG. 1 illustrates what is referred to as a multiple stage "4-to-2" carry save adder 100 that includes multiple carry save adders 101A-B cascaded together. Carry save adders may often be cascaded together where each cascaded carry save adder may be referred to as a cell or stage.

Referring to FIG. 1, as stated above, a multiple stage 4-to-2 carry save adder 100 may include 4-to-2 carry save adders 101A, 101B. 4-to-2 carry save adders 101A, 101B may collectively or individually be referred to as 4-to-2 carry save adders 101 or 4-to-2 carry save adder 101, respectively. 4-to-2 carry save adders 101A, 101B may include full adders 102A-B, 102C-D, respectively, that each receive three inputs and output a carry and a sum bit. Full adders 102 A-D may collectively or individually be referred to as full adders 102 or full adder 102, respectively. Full adders 102A, 102C may be referred to as the lower order full adder or carry save adder. Full adders 102B, 102D may be referred to as the higher order full adder or carry save adder.

Referring to FIG. 1, full adder 102A of 4-to-2 carry save adder 101A may receive three inputs, designated as A, B and C. Full adder 102A may output a carry and a sum bit, designated as C'out and Sum'. The output, Sum', may be input to the following full adder 102, full adder 102B, of 4-to-2 carry save adder 101A. Full adder 102B may also receive the inputs designated as D and C'in. The carry C'in may refer to the carry out bit, C'''out, generated by carry save adder 101B (lower order full adder 102C) in the previous stage or stage (next lower order bit). Full adder 102B may output a carry bit and a sum bit, designated as C''out and Sum'', respectively.

4-to-2 carry save adder 101B may be configured similarly as 4-to-2 carry save adder 101A. Full adder 102C may receive inputs A', B' and C' and outputting outputs C'''out and Sum'''. The output, Sum''', may be inputted to full adder 102D. Full adder 102D may also receive inputs D' and C''''in where C''''in may refer to the carry out bit generated by the 4-to-2 carry save adder (lower order full adder) in the previous stage or stage (next lower order bit). Full adder 102D may output a carry bit and a sum bit, designated as C''''out and Sum''''.

As illustrated in FIG. 1, the input, C'in, to full adder 102B was generated from full adder 102C of 4-to-2 carry save adder 101B located in the previous stage. Since the signal, C'in, is generated from the previous stage, it takes time to propagate to the current stage and input into full adder 102B of 4-to-2 carry save adder 101A. Due to the propagation delay of signals generated from previous stages, such as signal C'in, the outputs generated by carry save adders, such as full adder 102B, are delayed. Hence, there is a need in the art to reduce the delay in outputting the sum and carry bits.

Carry save adders, such as 4-to-2 carry save adders, have been typically built using static logic such as pass transistors and multiplexers. Dynamic logic, on the other hand, has the advantage in both speed and area consumed on the chip over static logic. However, dynamic logic dissipates power even when the input signal states are unchanged.

Additionally, dynamic logic may be implemented in a dual rail embodiment in which all of the logic is duplicated, one gate for each sense of the data. That is, each logic element includes a gate to produce the output signal, and an additional gate to produce its complement. Such implementations may exacerbate the power dissipation in dynamic logic elements, as well as obviate the area advantages of dynamic logic embodiments.

Limited switching dynamic logic (LSDL) produce circuits which mitigate the dynamic switching factor of dynamic logic gates with the addition of static logic devices which serve to isolate the dynamic node from the output node. Additional details regarding LSDL circuits are described in U.S. patent application Ser. No. 10/116,612, filed on Apr. 4, 2002, entitled "Circuits and Systems for Limited Switch Dynamic Logic," which is hereby incorporated herein by reference in its entirety. Additionally, LSDL circuits and systems maintain the area advantage of dynamic logic over static circuits, and further provide both logic senses, that is, the output value and its complement. Hence, it would be desirable to implement LSDL in carry save adders.

Therefore, there is a need in the art to build carry save adders using LSDL technology to use the lowest amount of area while reducing power consumption and improving speed such as by decreasing the delay of outputting the sum and carry bits.

SUMMARY

The problems outlined above may at least in part be solved in some embodiments by a carry save adder implementing limited switching dynamic logic (LSDL) circuits configured to output the sum and carry bits. The LSDL circuits use a carry generated in the current stage that was previously generated in the previous stage (next lower order bit position) thereby reducing the delay in outputting the sum and carry bits and hence improving the performance of carry save adders. Further, since LSDL circuits were used in the carry save adder, power consumption was reduced while using a small amount of area.

In one embodiment of the present invention, a carry save adder comprises a first limited switching dynamic logic circuit configured to output a sum bit. The carry save adder may further comprise a second limited switching dynamic logic circuit configured to output a carry bit. The carry save adder may further comprise a logic unit configured to compute a carry from a carry save adder located in a previous stage.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a 4-to-2 carry save adder configured to output sum and carry bits. In one embodiment of the present invention, the 4-to-2 carry save adder may comprise a first limited switching dynamic logic circuit configured to output a sum bit. The carry save adder may further comprise a second limited switching dynamic logic circuit configured to output a carry bit. Both the first and second limited switching dynamic logic circuits use a carry generated in the current stage that was previously generated in the previous stage (next lower order bit position). Since the carry is generated in the current stage and not in the previous stage, the delay in outputting the sum and carry bits is reduced and hence the performance of carry save adders is improved. Further, since limited switching dynamic logic circuits were used in the carry save adder, power consumption was reduced while using a small amount of area.

Although the present invention is described with reference to a 4-to-2 carry save adder used in an execution unit in a processor, it is noted that the principles of the present invention may be applied to any type of carry save adder used for addition whether or not the carry save adder is used in an execution unit. It is further noted that embodiments applying the principles of the present invention to such carry save adders would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 2:
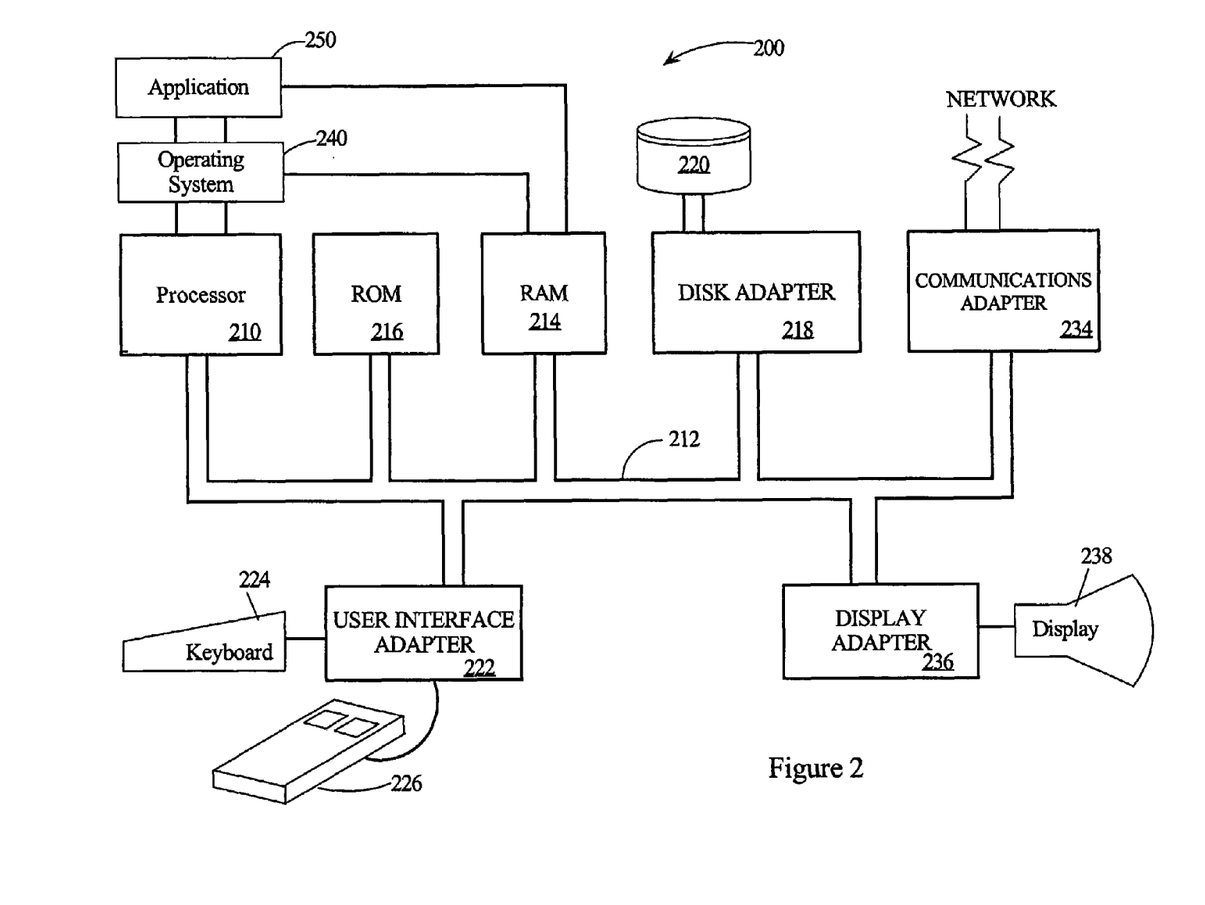
FIG. 2 illustrates a system configured in accordance with an embodiment of the present invention.

FIG. 2—System

FIG. 2 illustrates a typical hardware configuration of system 200 which is representative of a hardware environment for practicing the present invention. System 200 may have a processor 210 coupled to various other components by a system bus 212. A more detailed description of processor 210 is provided further below in association with FIG. 3. An operating system 240, may run on processor 210 and provide control and coordinate the functions of the various components of FIG. 2. An application 250 in accordance with the principles of the present invention may run in conjunction with operating system 240 and provide calls to operating system 240 where the calls implement the various functions or services to be performed by application 250. Read-Only Memory (ROM) 216 may be coupled to system bus 212 and include a basic input/output system ("BIOS") that controls certain basic functions of system 200. Random access memory (RAM) 214 and disk adapter 218 may also be coupled to system bus 212. It should be noted that software components including operating system 240 and application 250 may be loaded into RAM 214 which may be system's 200 main memory for execution. Disk adapter 218 may be an integrated drive electronics ("IDE") adapter that communicates with a disk unit 220, e.g., disk drive.

Referring to FIG. 2, system 200 may further comprise a communications adapter 234 coupled to bus 212. Communications adapter 234 may enable system 200 to communicate with other devices over a network. I/O devices may also be connected to system bus 212 via a user interface adapter 222 and a display adapter 236. Keyboard 224 and mouse 226 may all be interconnected to bus 212 through user interface adapter 222. Event data may be inputted to system 200 through any of these devices. A display monitor 238 may be connected to system bus 212 by display adapter 236. In this manner, a user is capable of inputting to system 200 through keyboard 224 or mouse 226 and receiving output from system 200 via display 238.

Figure 3:
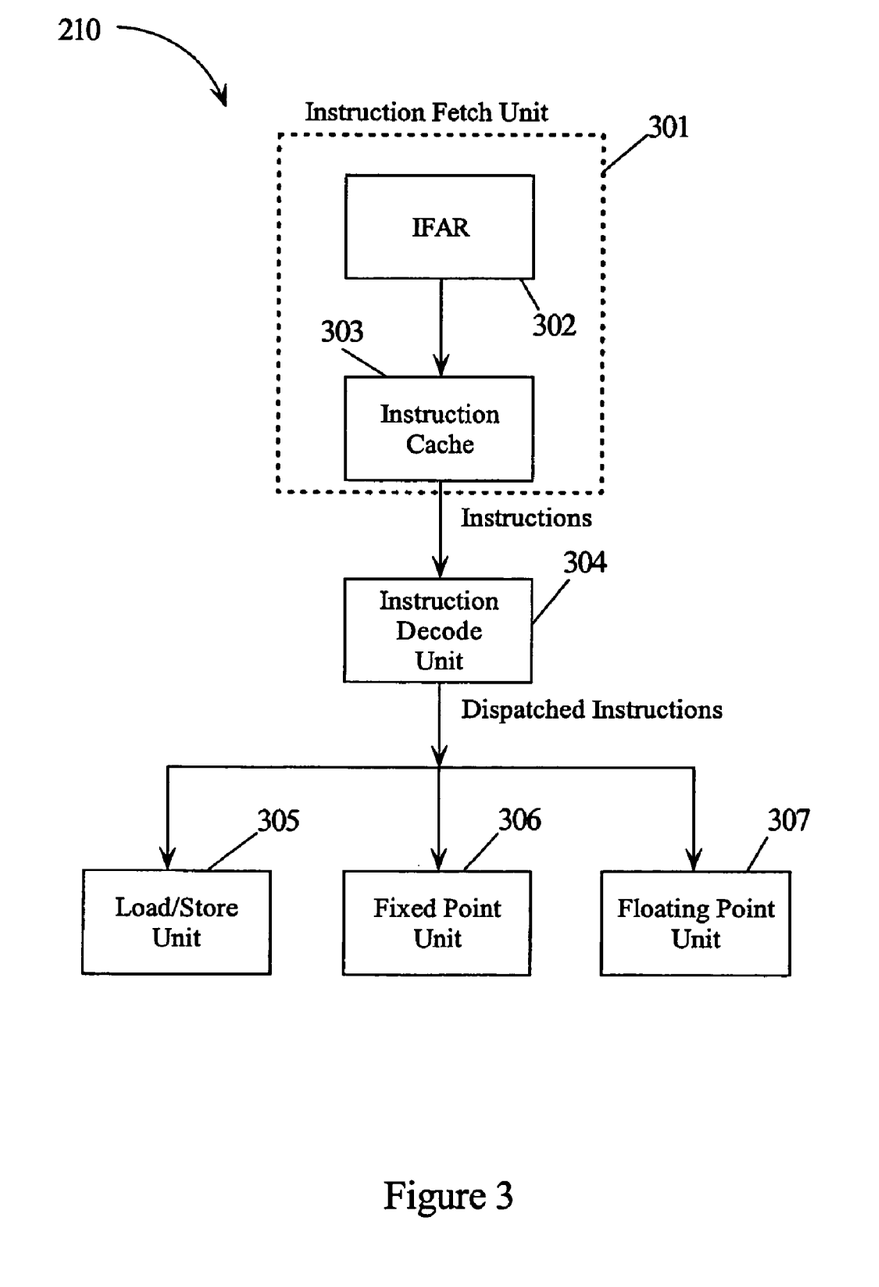
FIG. 3 illustrates an embodiment of the present invention of a processor of the system.

FIG. 3—Processor

FIG. 3 illustrates an embodiment of the present invention of processor 210 (FIG. 2). Referring to FIG. 3, processor 210 may comprise an instruction fetch unit 301 comprising an instruction fetch address register (IFAR) 302 coupled to an instruction cache 303. Processor 210 may further comprise an instruction decode unit 304 coupled to instruction fetch unit 301. Processor 210 may further comprise execution units: load/store unit 305, fixed point unit 306 and floating point unit 307. It is noted that processor 210 may include other and/or additional units that, for clarity, were not depicted. It is further noted that FIG. 3 is illustrative of an embodiment of processor 210 and FIG. 3 is not to be limited in scope to any one particular embodiment.

Referring to FIG. 3, IFAR 302 may be configured to receive each new instruction address, e.g., effective address representing an address from the program or compiler, such as from program counters (not shown) in system 200 (FIG. 2). The instruction corresponding to the received address may be accessed from instruction cache 303. Instruction cache 303 may be configured to store instructions.

Instructions may be retrieved from instruction cache 303 by instruction decode unit 304 to be decoded. Instruction decode unit 304 may comprise an instruction sequencer (not shown) configured to forward the decoded instructions to particular execution units, as described below, in an order determined by various algorithms. The decoded instructions may be forwarded to execution units: load/store unit 305, fixed point unit 306 and floating point unit 307. Each execution unit may execute one or more instructions of a particular class of instructions. For example, fixed point unit 306 may execute fixed point mathematical and logic operations on source operands, such as adding, subtracting, ANDing, ORing and XORing. Floating point unit 307 may execute floating point operations on source operands, such as floating point multiplication and division. Adding in the addition and multiplication processes may be accomplished in both fixed point unit 306 and floating point unit 307 using 4-to-2 carry save adders. These 4-to-2 carry save adders are discussed below in association with FIGS. 4A-D. Load/store unit 305 may be configured to input information from a data cache (not shown) or a system memory (not shown) in response to a load instruction. Further load/store unit 305 may be configured to output information to a data cache (not shown) or a system memory (not shown) in response to a store instruction.

As stated in the Background Information section, as illustrated in FIG. 1, the input, C'in, to full adder 102B was generated from full adder 102C of 4-to-2 carry save adder 101B of the next lower bit. Since the signal, C'in, is generated from the lower order bit, it takes time to propagate to the current stage and input into full adder 102B. Due to the propagation delay of signals generated from other bit positions, such as signal C'in, the outputs generated by carry save adders, such as full adder 102B, are delayed. Therefore, there is a need in the art to decrease the delay of the carry-in bit inputted to the carry save adder thereby decreasing the delay of outputting the sum and carry bits and improving the performance of carry save adders.

As further stated in the Background Information section, limited switching dynamic logic (LSDL) produce circuits which mitigate the dynamic switching factor of dynamic logic gates with the addition of static logic devices which serve to isolate the dynamic node from the output node. Additional details regarding LSDL circuits are described in U.S. patent application Ser. No. 10/116,612, filed on Apr. 4, 2002, entitled "Circuits and Systems for Limited Switch Dynamic Logic," which is hereby incorporated herein by reference in its entirety. Additionally, LSDL circuits and systems maintain the area advantage of dynamic logic over static circuits, and further provide both logic senses, that is, the output value and its complement. Hence, it would be desirable to implement LSDL technology in carry save adders.

A 4-to-2 carry save adder that implements LSDL technology to use the lowest amount of area while reducing power consumption and improving speed such as by decreasing the delay of outputting the sum and carry bits is discussed below in association with FIGS. 4A-E.

FIGS. 4A-E—Carry Save Adder

Figure 4A:
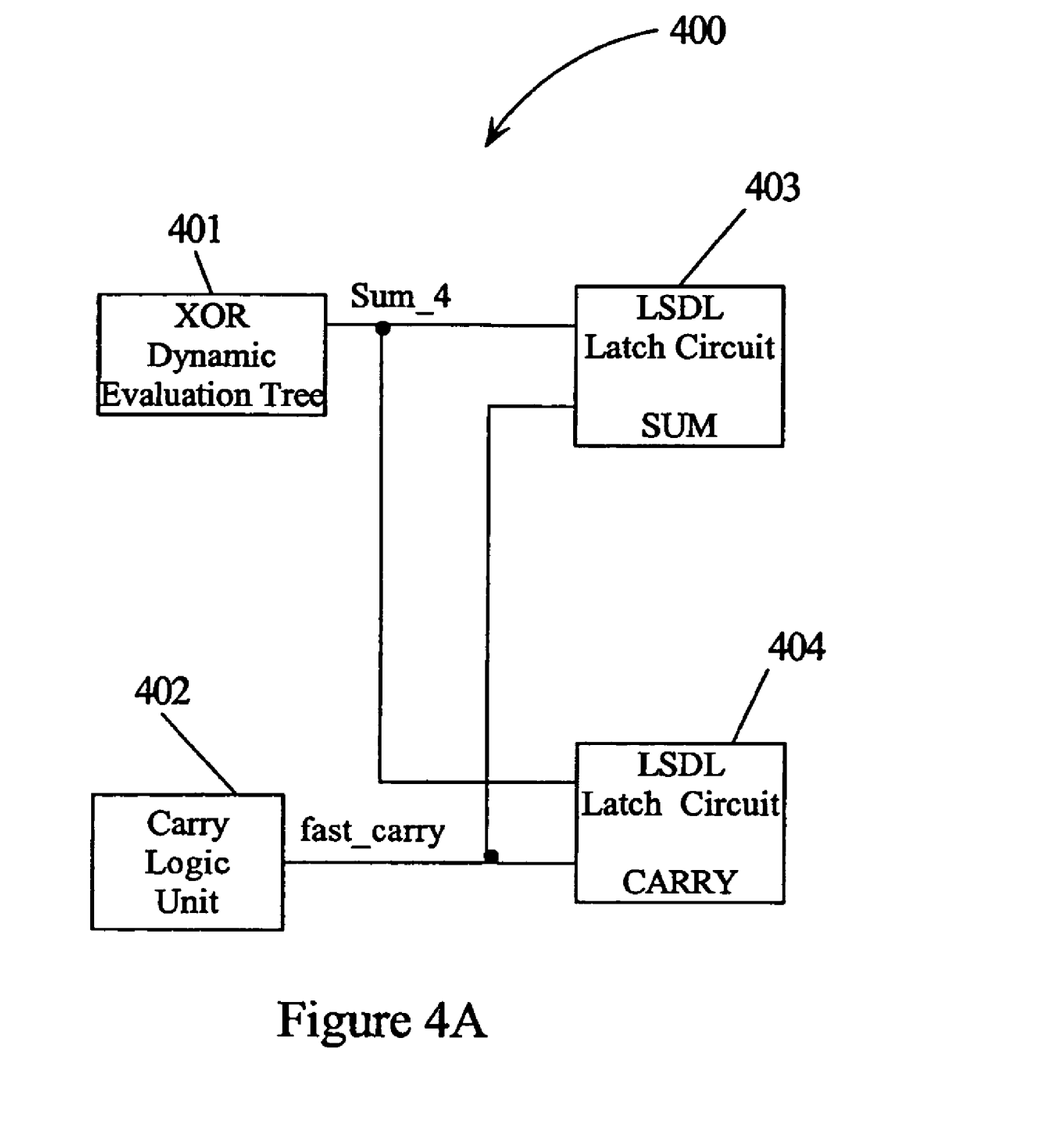
FIG. 4A illustrates a 4-to-2 carry save adder configured in accordance with an embodiment of the present invention.

FIG. 4A illustrates an embodiment of the present invention of a 4-to-2 carry save adder 400 that implements LSDL technology that uses the lowest amount of area while reducing power consumption and improving speed such as by decreasing the delay of outputting the sum and carry bits. As stated above, 4-to-2 carry save adder 400 may be implemented in fixed point unit 306 or in floating point unit 307. It is noted that 4-to-2 carry save adder 400 may be implemented in any execution unit to perform addition in addition and multiplication processes. It is further noted that embodiments incorporating such execution units would fall within the scope of the present invention.

Referring to FIG. 4A, 4-to-2 carry save adder 400 may include a 4-way XOR dynamic evaluation tree 401 configured to perform the XOR function on the inputs from the current stage thereby generating a sum bit (indicated as Sum4) as discussed in further detail below in association with FIG. 4B. 4-to-2 carry save adder 400 may further include a carry logic unit 402 configured to generate a carry-in bit (indicated as fast_carry) which, in one embodiment, is equivalent to the carry-out bit generated from the previous stage (next lower order bit position) as indicated as C'out in FIG. 1. A more detail discussion of carry logic unit 402 is discussed further below in association with FIG. 4C. 4-to-2 carry save adder 400 may further include an LSDL latch circuit 403 configured to compute the sum of 4-to-2 carry save adder and an LSDL latch circuit 404 configured to computer the carry of 4-to-2 carry save adder. A more detail discussion of LSDL latch circuits 403, 404 is discussed further below in association with FIGS. 4D-E, respectively.

Figure 4B:
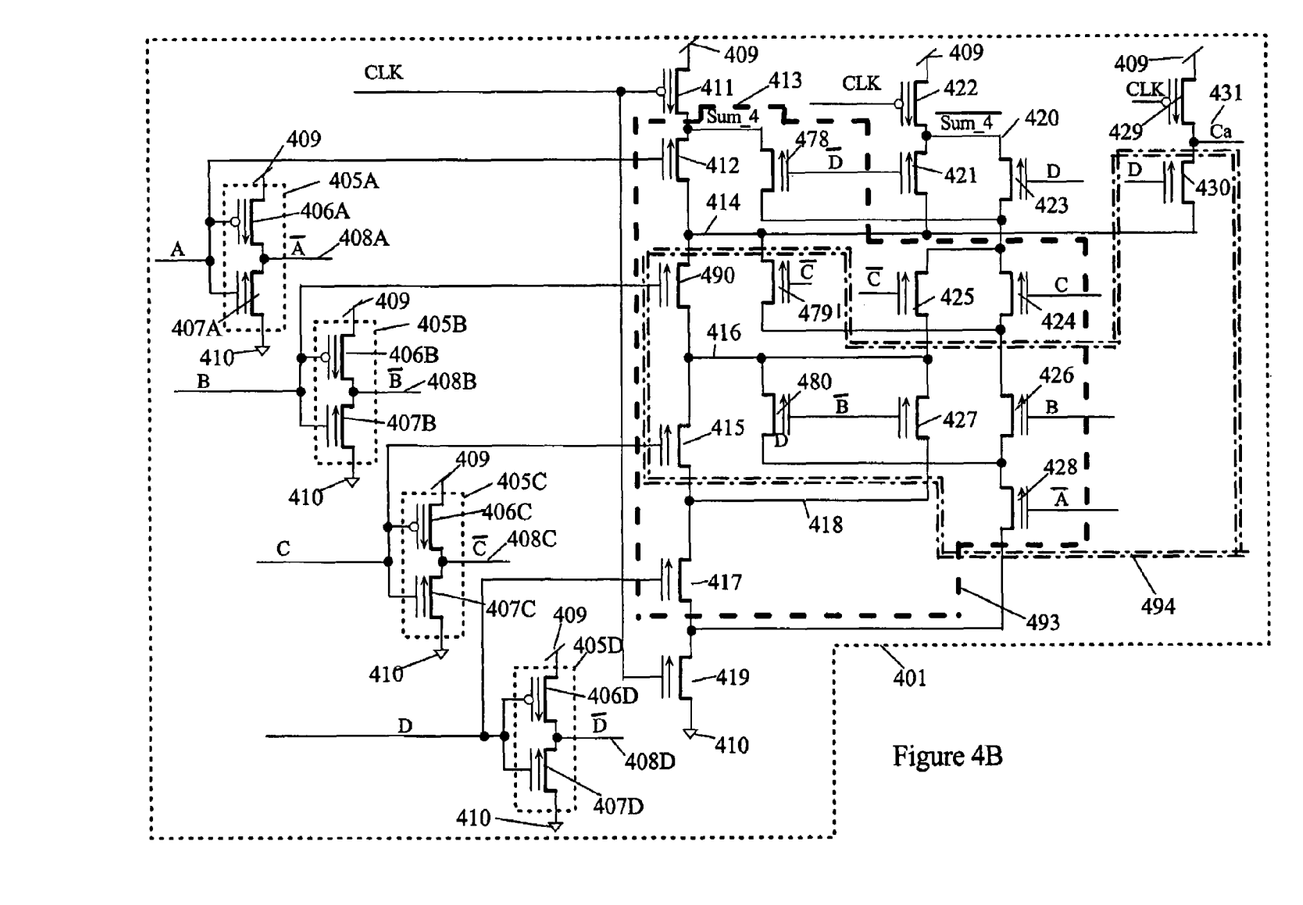
FIG. 4B illustrates an XOR dynamic evaluation tree of the 4-to-2 carry save adder configured in accordance with an embodiment of the present invention.

Referring to FIG. 4B, FIG. 4B illustrates an embodiment of the present invention of 4-way XOR dynamic evaluation tree 401. 4-way XOR dynamic evaluation tree 401 may be configured to perform the XOR operation on inputs to the current stage, designated as A, B, C and D, as illustrated in the following formula:

$$\text{Sum4} = A \oplus B \oplus C \oplus D \quad \text{(EQ 1)}$$

where Sum4 is the output of the XOR operation, as indicated by $\oplus$, on inputs A, B, C and D. The complement of Sum4 is indicated in FIG. 4 by Sum4'. The operation of EQ1 may be performed by the transistors located inside the box 493 outlined by a dashed line. A more detail description of these transistors is provided below.

In one embodiment, 4-way XOR dynamic evaluation tree 401 may comprise inverters 405A-D that invert inputs A, B, C and D, respectively. Inverters 405A-D may collectively or individually be referred to as inverters 405 or inverter 405, respectively. Inverter 405A may comprise a p-type transistor 406A whose drain is coupled to the drain of n-type transistor 407A at node 408A. The output of inverter 405A (node 408A) is the inverted value of input A as indicated by $\overline{A}$. The source of p-type transistor 406A may be coupled to power 409. The source of n-type transistor 407A may be coupled to ground 410.

Inverters 405B-D may be similarly configured as inverter 405A where p-type transistors 406B-D correspond to p-type transistor 406A and n-type transistors 407B-D correspond to n-type transistor 407A. Outputs of inverters 405B-D (nodes 408B-D, respectively) are the inverted values of inputs B-D, respectively, as indicated by $\overline{B}$, $\overline{C}$ and $\overline{D}$, respectively.

XOR dynamic evaluation tree 401 may further comprise p-type transistor 411. The source of p-type transistor 411 may be coupled to power 409. The gate of p-type transistor 411 may be coupled to a clock signal, designated as CLK. The drain of p-type transistor 411 may be coupled to the drain of n-type transistor 412 at node 413. The gate of n-type transistor 412 receives the input A. The output of 4-way XOR dynamic evaluation tree 401 is at node 413 with the value of Sum4. The source of n-type transistor 412 may be coupled to the drain of n-type transistor 490 at node 414. The gate of n-type transistor 490 receives the input B. The source of n-type transistor 490 may be coupled to the drain of n-type transistor 415 at node 416. The gate of n-type transistor 415 receives the input C. Further, the source of n-type transistor 415 may be coupled to the drain of n-type transistor 417 at node 418. The gate of n-type transistor 417 receives the input D. The source of n-type transistor 417 may be coupled to the drain of n-type transistor 419. The source of n-type transistor 419 may be coupled to ground 410. The gate of n-type transistor 419 may be coupled to a clock signal, designated as CLK.

XOR dynamic evaluation tree 401 may further comprise an n-type transistor 478. The drain of n-type transistor 478 may be coupled to node 413. The gate of n-type transistor 478 receives the complement of input D, designated as $\overline{D}$. XOR dynamic evaluation tree 401 may further comprise an n-type transistor 479. The drain of n-type transistor 479 may be coupled to node 414. The gate of n-type transistor 479 receives the complement of input C, designated as $\overline{C}$. XOR dynamic evaluation tree 401 may further comprise an n-type transistor 480. The drain of n-type transistor 480 may be coupled to node 416. The gate of n-type transistor 480 receives the complement of input B, designated as $\overline{B}$.

XOR dynamic evaluation tree 401 may further comprise a p-type transistor 422. The source of p-type transistor 422 may be coupled to power 409. The gate of p-type transistor 422 may be coupled to a clock signal, designated as CLK. The drain of p-type transistor 422 may be coupled to the drain of n-type transistor 421 at node 420. The gate of n-type transistor 421 receives the complement of input D, designated as $\overline{D}$. The source of n-type transistor 421 may be coupled to the drain of n-type transistor 479. The complement of the output of 4-way XOR dynamic evaluation tree 401 is at node 420, designated as $\overline{Sum4}$. Node 420 may further be coupled to the drain of n-type transistor 423. The gate of n-type transistor 423 receives the input D. The source of n-type transistor 423 may be coupled to the source of n-type transistor 478 and to the drain of n-type transistor 424. The gate of n-type transistor 424 receives the input C. The drain of n-type transistor 424 may be coupled to the drain of n-type transistor 425. The gate of n-type transistor 425 receives the input $\overline{C}$. The source of n-type transistor 425 may be coupled to the drain of n-type transistor 427. The source of n-type transistor 424 may be coupled to the source of n-type transistor 479 and to the drain of n-type transistor 426. The gate of n-type transistor 426 receives the input B. The source of n-type transistor 426 may be coupled to the source of n-type transistor 480. The drain of n-type transistor 427 may be coupled to the drain of n-type transistor 480. The gate of n-type transistor 427 receives the input $\overline{B}$. The source of n-type transistor 427 may be coupled to node 418. The source of n-type transistor 426 may be coupled to the drain of n-type transistor 428. The gate of n-type transistor 428 receives the complement of the input A, designated as $\overline{A}$. The source of n-type transistor 428 may be coupled to the source and drain of n-type transistors 417, 419, respectively.

XOR dynamic evaluation tree 401 may further comprise p-type transistor 429. The source of p-type transistor 429 may be coupled to power 409. The gate of p-type transistor 429 may be coupled to a clock signal, designated as CLK. The drain of p-type transistor 429 may be coupled to the drain of n-type transistor 430 at node 431. The gate of n-type transistor 430 receives input D. The source of n-type transistor 430 may be coupled to node 414. The output at node 431 is designated as "Ca" which is equal to the following equation:

$$Ca = (A \oplus B \oplus C) * D \qquad (EQ\ 2)$$

where Ca is equal to the XOR operation, as indicated by $\oplus$, performed on inputs A, B and C where that quantity is logically multiplied with the input D. It is noted that the symbol "*", as used herein, indicates the logical multiplication operation. It is further noted that the operation of EQ2 may be performed by the transistors located inside the box 494 outlined by a dashed line. The value of Ca may be used to compute the carry bit of 4-to-2 carry save adder 400 as discussed further below.

Figure 4C:
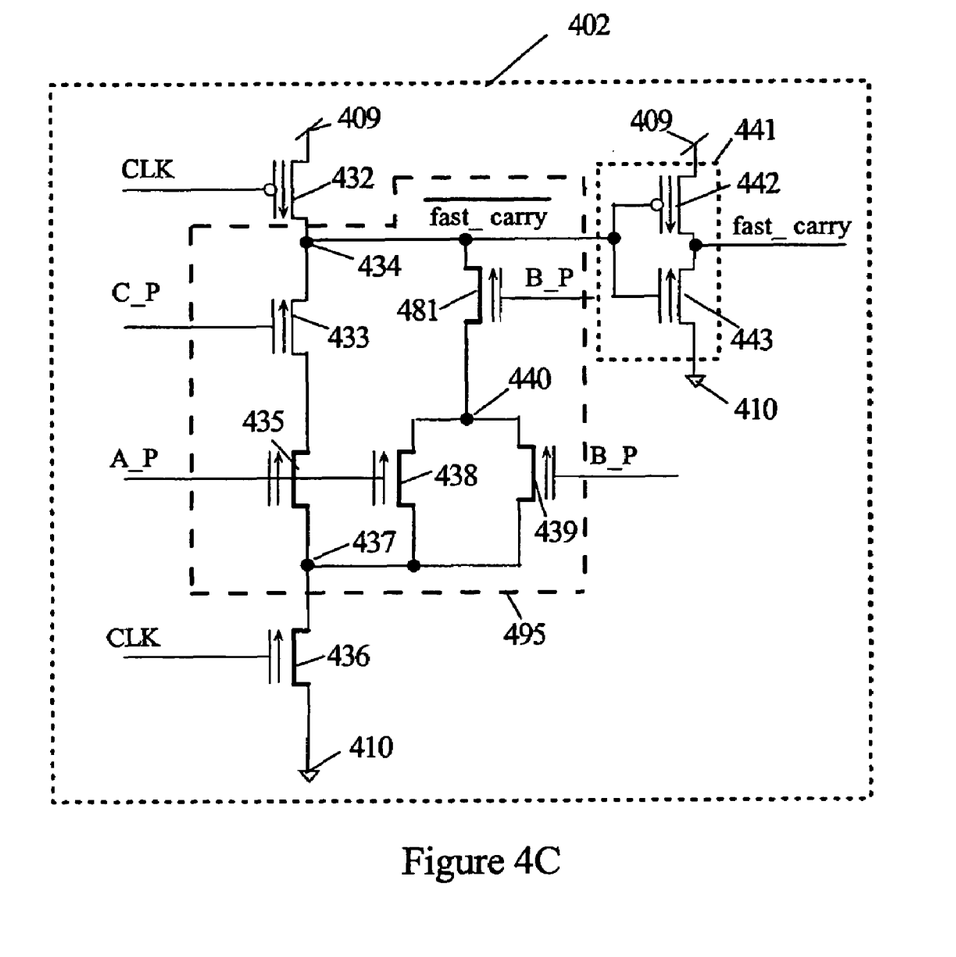
FIG. 4C illustrates a logic unit of the 4-to-2 carry save adder configured in accordance with an embodiment of the present invention.

Referring to FIG. 4C, FIG. 4C illustrates an embodiment of the present invention of carry logic unit 402. As stated above, 4-to-2 carry save adder 400 may include carry logic unit 402 configured to generate a carry-in bit (indicated as fast_carry or its complement indicated as $\overline{fast\_carry}$) which, in one embodiment, is equivalent to the carry-out bit generated from the previous stage (next lower order bit position) as indicated as C'''out in FIG. 1. Since this carry-in bit is generated in the current bit position, the delay of inputting the carry-in bit to the 4-to-2 carry save adder 400 is reduced. Consequently, the delay of outputting the sum and carry bits of 4-to-2 carry save adder 400 is reduced and hence the performance of carry save adders is improved.

Carry logic unit 402 may perform the majority function on the inputs A_P, B_P and C_P inputted to the previous stage (not shown) as illustrated in the following formula:

$$fast\_carry = A\_P * B\_P + A\_P * C\_P + B\_P * C\_P \qquad (EQ\ 3)$$

where the majority function outputs the value that at least two of the input signals possess. It is noted that the symbol "+", as used herein, indicates the logical addition operation. It is further noted that the _P indicates a previous stage. For example, if the inputs A_P and B_P had a logical value of 1 and the input C_P had a logical value of 0, then the majority function outputs the logical value of 1. It is noted that the inputs A_P, B_P and C_P inputted to the previous stage (next lower order bit position) were previously used to generate the carry-out bit, as indicated by C'out in FIG. 1. It is further noted that the operation of EQ3 may be performed by the transistors located inside the box 495 outlined by a dashed line. A more detail description of these transistors is provided below. Now, as stated above, this carry-out bit is generated in the current stage by carry logic unit 402.

Referring to FIG. 4C, carry logic unit 402 may comprise p-type transistor 432. The source of p-type transistor may be coupled to power 409. The gate of p-type transistor 432 may be coupled to a clock signal, designated as CLK. The drain of p-type transistor 432 may be coupled to the drain of n-type transistor 433 at node 434. The gate of n-type transistor 433 receives the input C_P from the previous stage (next lower order bit position). The source of n-type transistor 433 may be coupled to the drain of n-type transistor 435. The gate of n-type transistor 435 receives the input A_P from the previous stage (next lower order bit position). The source of n-type transistor 435 may be coupled to the drain of n-type transistor 436 at node 437. The gate of n-type transistor 436 may be coupled to a clock signal, designated as CLK. The source of n-type transistor 436 may be coupled to ground 410.

Node 434 may be coupled to the drain of n-type transistor 481. Further, the output of carry logic unit 402 is at node 434 with the complement value of fast-carry, as indicated by $\overline{\text{fast\_carry}}$. The gate of n-type transistor 481 receives the input B_P from the previous stage (next lower order bit position). The source of n-type transistor 481 may be coupled to the drains of n-type transistors 438, 439 at node 440. The gate of n-type transistor 438 receives the input A_P from the previous stage (next lower order bit position). The gate of n-type transistor 439 receives the input B_P from the previous stage (next lower order bit position). The sources of n-type transistors 438, 439 may be coupled to node 437.

The value of $\overline{\text{fast\_carry}}$ may be inverted by inverter 441 whose output is fast_carry. Inverter 441 may comprise p-type transistor 442 coupled to n-type transistor 443.

Figure 4D:
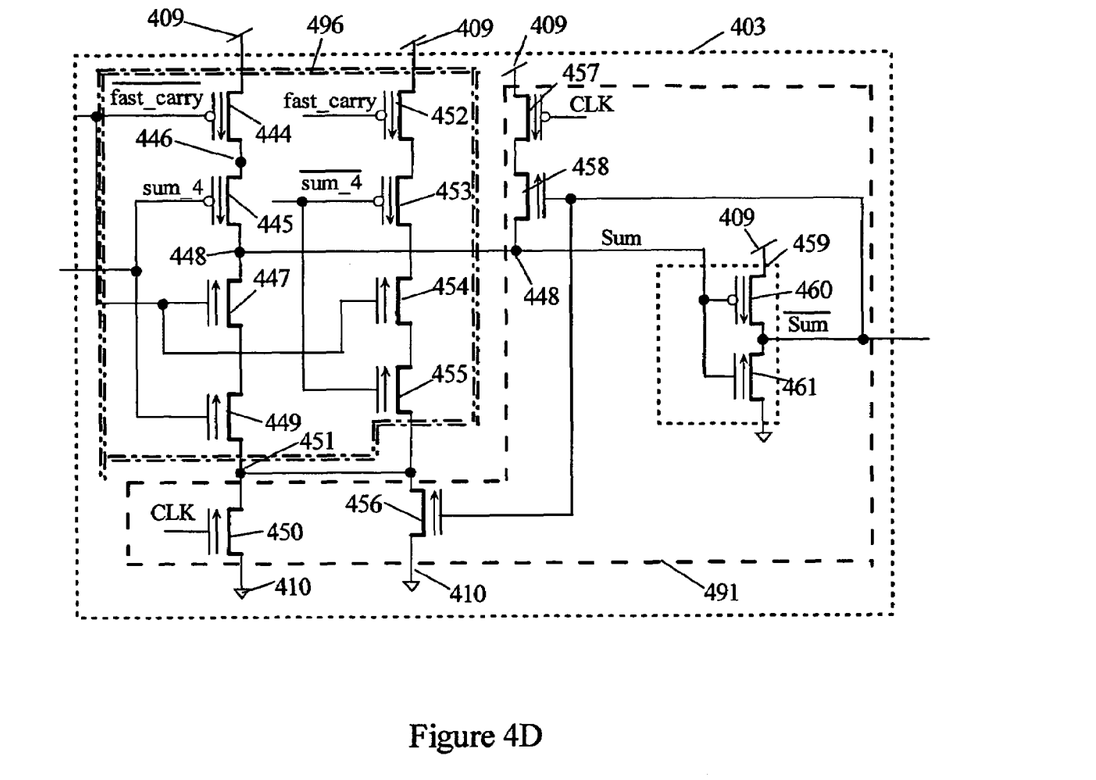
FIG. 4D illustrates limited switching dynamic logic circuits of the 4-to-2 carry save adder configured in accordance with an embodiment of the present invention.

As stated above, the outputs of 4-to-2 carry save adder 400, the sum and carry bit, may be outputted by LSDL latch circuit 403 and LSDL latch circuit 404, respectively. Referring to FIG. 4D, FIG. 4D illustrates an embodiment of the present invention of LSDL latch circuit 403. The base LSDL latching structure in LSDL latch circuit 403 is identified in box 491 as outlined by a dashed line. A more detail description of these transistors is provided below. The remaining transistors in LSDL latch circuit 403 are configured to perform the computation during the latching process as described in U.S. patent application Ser. No. 10/116,612, filed on Apr. 4, 2002, entitled "Circuits and Systems for Limited Switch Dynamic Logic," which is hereby incorporated herein by reference in its entirety.

LSDL latch circuit 403 may output the sum bit using the following equation:

$$\text{Sum} = \text{Sum4} \oplus \text{fast\_carry} \quad (\text{EQ 4})$$

where Sum is equal to the XOR operation, as indicated by $\oplus$, performed on Sum4 and fast_carry. The operation of EQ4 may be performed by the transistors located inside the box 496 outlined by a dashed line. A more detail description of these transistors is provided below Referring to FIG. 4D, LSDL latch circuit 403 may comprise a p-type transistor 444. The source of p-type transistor 444 may be coupled to power 409. The gate of p-type transistor 444 receives the input $\overline{\text{fast\_carry}}$, as defined above. The drain of p-type transistor 444 may be coupled to the source of p-type transistor 445 at node 446. The gate of p-type transistor 445 receives the input Sum4, as defined above. The drain of p-type transistor 445 may be coupled to the drain of n-type transistor 447 at node 448. The gate of n-type transistor 447 receives the input $\overline{\text{fast\_carry}}$, as defined above. The drain of n-type transistor 447 may be coupled to the drain of n-type transistor 449. The gate of n-type transistor 449 receives the input Sum4, as defined above. The source of n-type transistor 449 may be coupled to the drain of n-type transistor 450 at node 451. The gate of n-type transistor 450 receives a clock signal, designated as CLK. The source of n-type transistor 450 may be coupled to ground 410.

LSDL latch circuit 403 may further comprise p-type transistor 452. The source of p-type transistor 452 may be coupled to power 409. The gate of p-type transistor 452 receives the input fast_carry, as defined above. The drain of p-type transistor 452 may be coupled to the source of p-type transistor 453. The gate of p-type transistor receives the input $\overline{\text{Sum4}}$, as defined above. The drain of p-type transistor 453 may be coupled to the drain of n-type transistor 454. The gate of n-type transistor 454 receives the input $\overline{\text{fast\_carry}}$, as defined above. The source of n-type transistor 454 may be coupled to the drain of n-type transistor 455. The gate of n-type transistor 455 receives the input $\overline{\text{Sum4}}$, as defined above. The source of n-type transistor 455 may be coupled to the drain of n-type transistor 456 at node 451. The source of n-type transistor 456 may be coupled to ground 410.

LSDL latch circuit 403 may further comprise p-type transistor 457. The source of p-type transistor 457 may be coupled to power 409. The gate of p-type transistor 457 receives a clock signal, designated as CLK. The drain of p-type transistor 457 may be coupled to the drain of n-type transistor 458. The gate of n-type transistor 458 may be coupled to the gate of n-type transistor 456. The source of n-type transistor 458 may be coupled to node 448. The output of LSDL latch circuit 403 is at node 448 with the value of Sum. The value of Sum may be inverted by inverter 459 generating the complement value of Sum, $\overline{\text{Sum}}$.

Inverter 459 may comprise p-type transistor 460 coupled to n-type transistor 461. The source of p-type transistor 460 may be coupled to power 409. The gate of p-type transistor 460 may be coupled to node 448. The drain of p-type transistor 460 may be coupled to the drain of n-type transistor 461. The gate of n-type transistor 461 may be coupled to node 448. The source of n-type transistor 461 may be coupled to ground 410. The output of inverter 459 is $\overline{\text{Sum}}$.

Figure 4E:
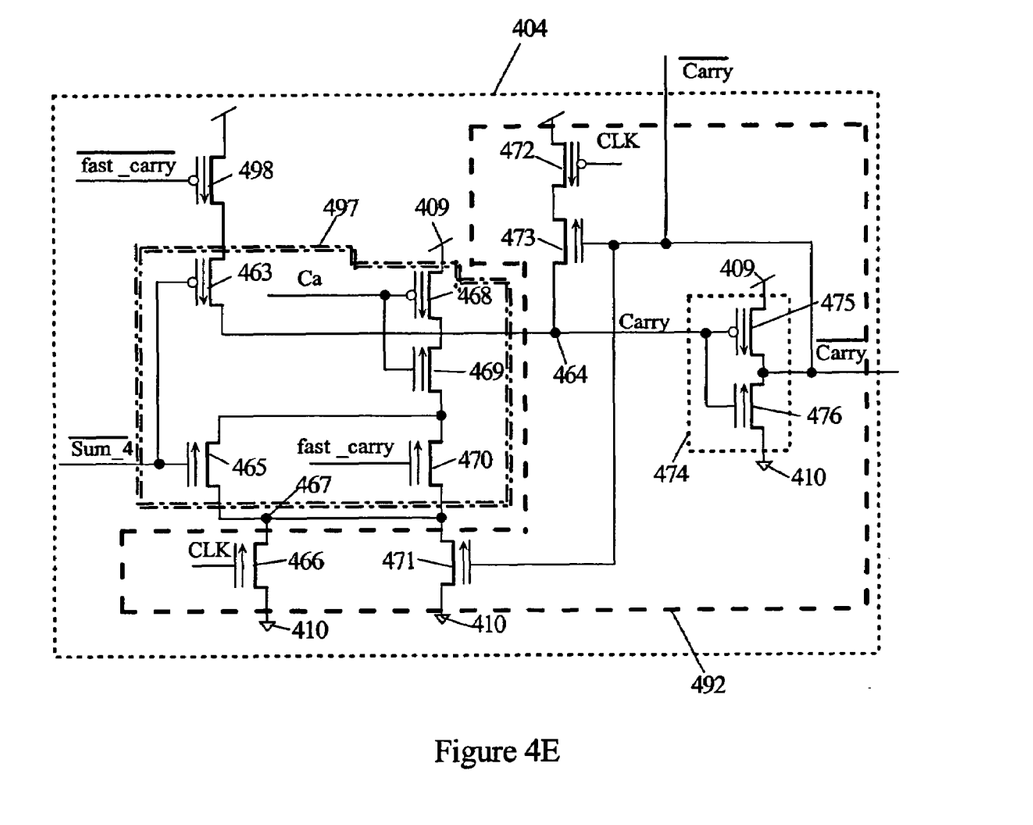
FIG. 4E illustrates an embodiment of the present invention of a LSDL latch circuit.

Referring to FIG. 4E, FIG. 4E illustrates an embodiment of the present invention of LSDL latch circuit 404. The base LSDL latching structure in LSDL latch circuit 404 is identified in box 492 as outlined by a dashed line. A more detail description of these transistors is provided below. The remaining transistors in LSDL latch circuit 404 are configured to perform the computation during the latching process as described in U.S. patent application Ser. No. 10/116,612, filed on Apr. 4, 2002, entitled "Circuits and Systems for Limited Switch Dynamic Logic," which is hereby incorporated herein by reference in its entirety.

As stated above, LSDL latch circuit 404 may be configured to output the carry bit, as identified by "Carry," of 4-to-2 carry save adder 400. LSDL latch circuit 404 may perform the majority function on the inputs Ca, Sum4 and fast_carry as illustrated in the following formula:

$$\text{Carry} = Ca^*\text{Sum4} + Ca^*\text{fast\_carry} + \text{Sum4}^*\text{fast\_carry} \quad (\text{EQ 5})$$

where the majority function outputs the value that at least two of the input signals possess. For example, if the inputs Ca and Sum4 had a logical value of 1 and the input fast_carry had a logical value of 0, then the majority function outputs the logical value of 1. The operation of EQ5 may be performed by the transistors located inside the box 497 outlined by a dashed line. A more detail description of these transistors is provided below In one embodiment of the present invention, LSDL latch circuit 404 may comprise p-type transistor 498. The source of p-type transistor 498 may be coupled to power 409. The gate of p-type transistor 498 may receive the input fast_carry, as defined above. The drain of p-type transistor 498 may be coupled to the source of p-type transistor 463. The gate of p-type transistor 463 receives the input $\overline{\text{Sum4}}$, as defined above. The drain of p-type transistor 463 may be coupled to node 464. LSDL latch circuit 404 may further include n-type transistor 465. The gate of n-type transistor 465 receives the input $\overline{\text{Sum4}}$, as defined above. The source of n-type transistor 465 may be coupled to the drain of n-type transistor 466 at node 467. The gate of n-type transistor 466 receives a clock signal, designated as CLK. The source of n-type transistor 466 may be coupled to ground 410.

LSDL latch circuit 404 may further comprise p-type transistor 468. The source of p-type transistor 468 may be coupled to power 409. The gate of p-type transistor 468 receives the input Ca, as defined above. The drain of p-type transistor 468 may be coupled to the drain of n-type transistor 469. The gate of n-type transistor 469 receives the input Ca, as defined above. The source of n-type transistor 469 may be couple to the drains of n-type transistors 465, 470. The gate of n-type transistor 470 receives the input fast_carry, as defined above. The source of n-type transistor 470 may be coupled to the drain of n-type transistor 471 at node 467. The source of n-type transistor 471 may be coupled to ground 410.

LSDL latch circuit 404 may further comprise p-type transistor 472. The source of p-type transistor 472 may be coupled to power 409. The gate of p-type transistor 472 receives a clock signal, designated as CLK. The drain of p-type transistor 472 may be coupled to the drain of n-type transistor 473. The gate of n-type transistor 473 may be coupled to the gate of n-type transistor 471. The source of n-type transistor 473 may be coupled to node 464.

The output of LSDL latch circuit 404 is at node 464 with the value of Carry. The value of Carry may be inverted by inverter 474 generating the complement value of Carry, $\overline{\text{Carry}}$.

Inverter 474 may comprise p-type transistor 475 coupled to n-type transistor 476. The source of p-type transistor 475 may be coupled to power 409. The gate of p-type transistor 475 may be coupled to node 464. The drain of p-type transistor 475 may be coupled to the drain of n-type transistor 476. The gate of n-type transistor 476 may be coupled to node 464. The source of n-type transistor 476 may be coupled to ground 410. The output of inverter 474 is $\overline{\text{Carry}}$.

LSDL latch circuits 403, 404, as illustrated in FIGS. 4D-E, may reduce the switching at the output to a minimal amount thus saving on power. While these circuits 403, 404 have been illustrated using LSDL circuitry, it is noted that circuits 403, 404 may be designed using any other form of dynamic logic.

It is noted that one of ordinary skill in the art would recognized that 4-to-2 carry save adder 400 may be configured with different circuitry providing the same functionality as discussed above. For example, n-type logic, e.g., n-type transistors, may be replaced with p-type logic, e.g., p-type transistors, and vice-versa.

Although the system and carry save adder is described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A carry save adder comprising:
a circuit configured to perform a first sum operation on a first plurality of inputs to said carry save adder, wherein said circuit is further configured to generate a first carry;
a logic unit configured to compute a second carry using inputs from a carry save adder located in a previous stage;
a first limited switching dynamic logic circuit configured to output a sum bit using said second carry and an output of said first sum operation; and
a second limited switching dynamic logic circuit coupled to said first limited switching dynamic logic circuit, wherein said second limited switching dynamic logic circuit is configured to output a carry bit using said second carry, said output of said first sum operation and said first carry.

2. The carry save adder as recited in claim 1, wherein said logic unit receives a second plurality of inputs from said carry save adder located in said previous stage, wherein said logic unit performs a majority function on said second plurality of inputs from said carry save adder located in said previous stage.

3. The carry save adder as recited in claim 2, wherein said second plurality of inputs from said carry save adder located in said previous stage comprises a first input A_P, a second input B_P, and a third input, C_P, wherein said majority function on said second plurality of inputs from said carry save adder located in said previous stage comprises:

(A_P*B_P)+(A_P*C_P)+(B_P*C_P); and wherein said second carry comprises a result of said majority function.

4. The carry save adder as recited in claim 1, wherein said first plurality of inputs to said carry save adder comprises a fourth input, A, a fifth input, B, a sixth input, C, and a seventh input, D, wherein said first sum operation on said first plurality of inputs to said carry save adder comprises:

A⊕B⊕C⊕D.

5. The carry save adder as recited in claim 4, wherein said first carry is generated as a result of an operation comprising:

(A⊕B⊕C)*D.

6. The carry save adder as recited in claim 1, wherein said first limited switching dynamic logic circuit is configured to generate said sum bit by performing a second sum operation on said output of said first sum operation and said second carry.

7. The carry save adder as recited in claim 6, wherein said second sum operation comprises a result generated by the exclusive-OR of said output of said first sum operation and said second carry, wherein said sum bit comprises a result of said second sum operation.

8. The carry save adder as recited in claim 1, wherein said second limited switching dynamic logic circuit is configured to generate said carry bit by performing a majority function on said output of said first sum operation, said first carry and said second carry.

9. The carry save adder as recited in claim 8, wherein said majority function on said output of said first sum operation, said first carry and said second carry comprises:

carry=Ca*Sum4+Ca*fast_carry+Sum4*fast_carry wherein Ca comprises said first carry;
wherein Sum4 comprises said output of said first sum operation; and
wherein fast_carry comprises said result of said majority function on said second plurality of inputs from said carry save adder located in said previous stage.

10. A system, comprising:
a memory unit;
a processor coupled to said memory unit, wherein said processor comprises:
an instruction unit;
an execution unit coupled to said instruction unit, wherein said instruction unit is configured to dispatch an instruction to said execution unit, wherein said execution unit is configured to execute said dispatched instruction, wherein said execution unit comprises a carry save adder, wherein said carry save adder comprises:
- a circuit configured to perform a first sum operation on a first plurality of inputs to said carry save adder, wherein said circuit is further configured to generate a first carry;
- a logic unit configured to compute a second carry using inputs from a carry save adder located in a previous stage;
- a first limited switching dynamic logic circuit configured to output a sum bit using said second carry and an output of said first sum operation; and
- a second limited switching dynamic logic circuit coupled to said first limited switching dynamic logic circuit, wherein said second limited switching dynamic logic circuit is configured to output a carry bit using said second carry, said output of said first sum operation and said first carry.

11. The system as recited in claim 10, wherein said logic unit receives a second plurality of inputs from said carry save adder located in said previous stage, wherein said logic unit performs a majority function on said second plurality of inputs from said carry save adder located in said previous stage.

12. The system as recited in claim 11, wherein said second plurality of inputs from said carry save adder located in said previous stage comprises a first input, A_P, a second input, B_P and a third input, C_P, wherein said majority function on said second plurality of inputs from said carry save adder located in said previous stage comprises:

(A_P*B_P)+(A_P*C_P)+(B_P*C_P); and wherein said second carry comprises a result of said majority function.

13. The system as recited in claim 10, wherein said first plurality of inputs to said carry save adder comprises a fourth input, A, a fifth input, B, a sixth input, C, and a seventh input, D, wherein said first sum operation on said first plurality of inputs to said carry save adder comprises:

A⊕B⊕C⊕D.

14. The system as recited in claim 13, wherein said first carry is generated as a result of an operation comprising:

(A⊕B⊕C)*D.

15. The system as recited in claim 10 wherein said first limited switching dynamic logic circuit is configured to generate said sum bit by performing a second sum operation on said output of said first sum operation and said second carry.

16. The system as recited in claim 15, wherein said second sum operation comprises a result generated by the exclusive-OR of said output of said first sum operation and said second carry, wherein said sum bit comprises a result of said second sum operation.

17. The system as recited in claim 10, wherein said second limited switching dynamic logic circuit is configured to generate said carry bit by performing a majority function on said output of said first sum operation, said first carry and said second carry.

18. The system as recited in claim 17, wherein said majority function on said output of said first sum operation, said first carry and said second carry comprises:

carry=Ca*Sum4+Ca*fast_carry+Sum4*fast_carry wherein Ca comprises said first carry;

wherein Sum4 comprises said output of said first sum operation; and wherein fast_carry comprises said result of said majority function on said second plurality of inputs from said carry save adder located in said previous stage.

* * * * *